United States Patent

Dutt et al.

[11] Patent Number: 5,614,676
[45] Date of Patent: Mar. 25, 1997

[54] METHOD OF MACHINE VIBRATION ANALYSIS FOR TIRE UNIFORMITY MACHINE

[75] Inventors: William R. Dutt, Akron; John M. Maloney, Medina; Charles D. Juhasz, Akron, all of Ohio

[73] Assignee: The Goodyear Tire & Rubber Company, Akron, Ohio

[21] Appl. No.: 612,705

[22] Filed: Mar. 8, 1996

[51] Int. Cl.$^6$ .......................... G01M 1/22; G01M 13/00
[52] U.S. Cl. .......................... 73/660; 73/1 B; 73/1 DV; 73/146; 73/462; 364/508
[58] Field of Search ................. 73/462, 1 B, 1 DV, 73/650, 660, 659, 146, 459, 8; 364/506, 508; 451/1, 5, 28, 254, 258, 920; 157/13

[56] References Cited

U.S. PATENT DOCUMENTS

| | | | |
|---|---|---|---|
| 3,739,533 | 6/1973 | Iida et al. | 451/28 |
| 3,946,527 | 3/1976 | Beer | 73/146 |
| 4,404,848 | 9/1983 | Iwama et al. | 73/146 |
| 4,494,400 | 1/1985 | Hill | 73/1 B |
| 5,309,377 | 5/1994 | Beebe | 73/146 |

*Primary Examiner*—Hezron E. Williams
*Assistant Examiner*—Rose M. Finley
*Attorney, Agent, or Firm*—Howard M. Cohn; David E. Wheeler

[57] ABSTRACT

A method for analyzing the vibration of a tire uniformity machine having a number of rotating components uses the signals from load cells when the machine idle to output voltage signals that are then amplified and input into a computer as unfiltered, amplified voltage signals. The signals are converted into a power spectrum and selected groups of frequencies and their amplitude are compared with acceptable amplitudes for the frequencies generated by various rotating parts of the machine. When at least one of the amplitudes for different frequencies is greater than at least one of the acceptable amplitudes for the frequencies generating different rotating parts of the machine, the computer outputs an alarm signal.

16 Claims, 4 Drawing Sheets

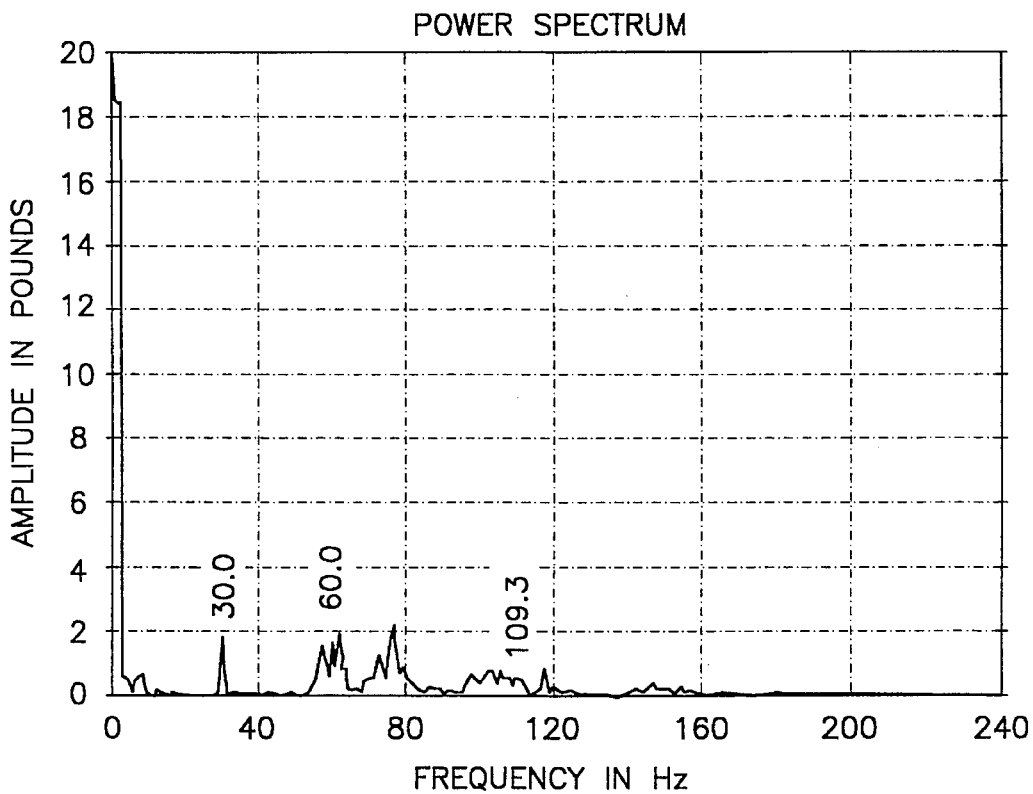
Fig.4 LATERAL LOAD CELL SIGNALS WITHOUT GRINDER TURNING
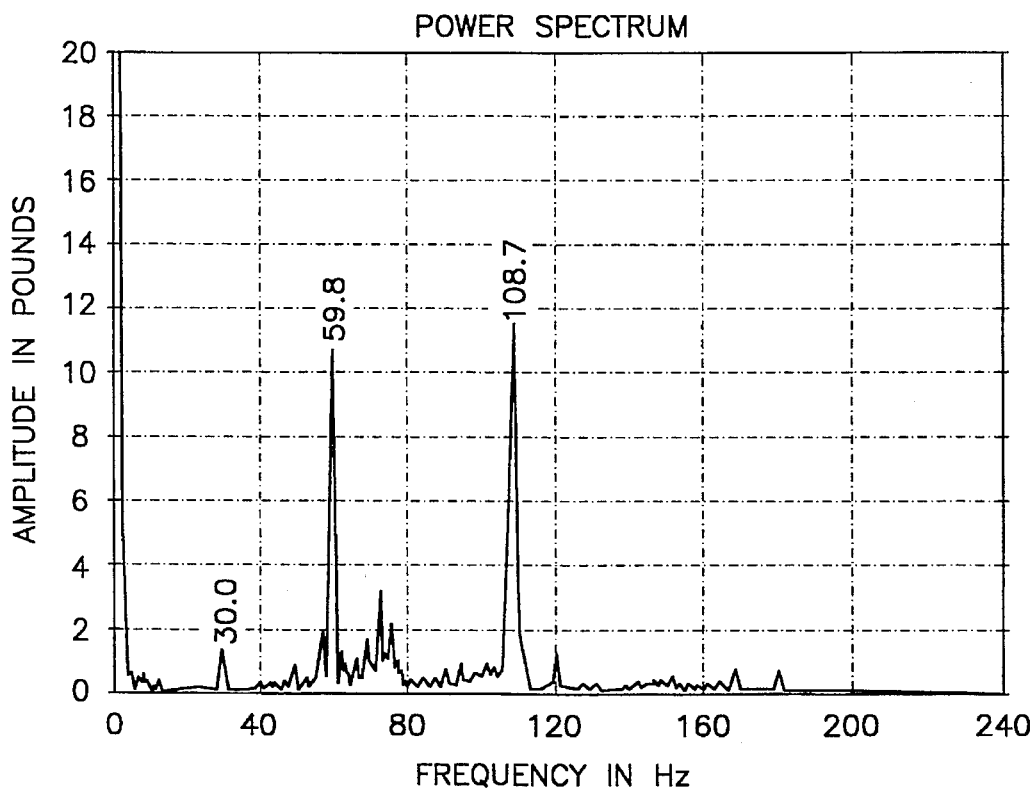
Fig.5 LATERAL LOAD CELL SIGNALS WITH GRINDER TURNING

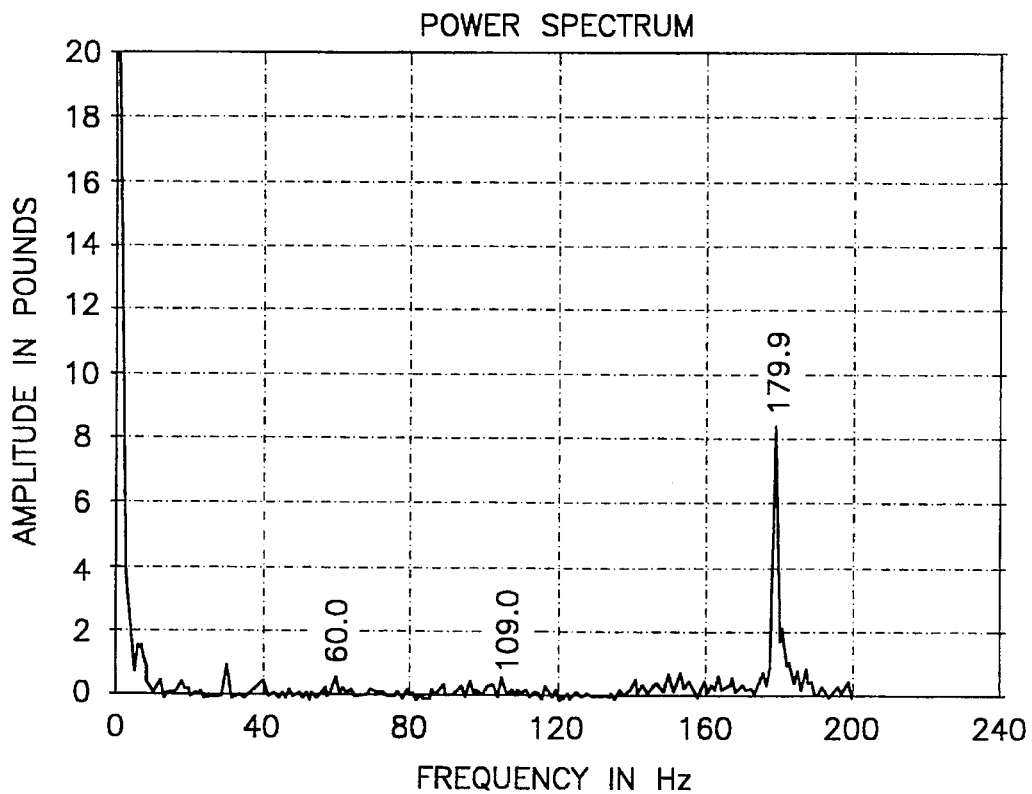
Fig. 6 RADIAL LOAD CELL SIGNALS WITHOUT GRINDER TURNING
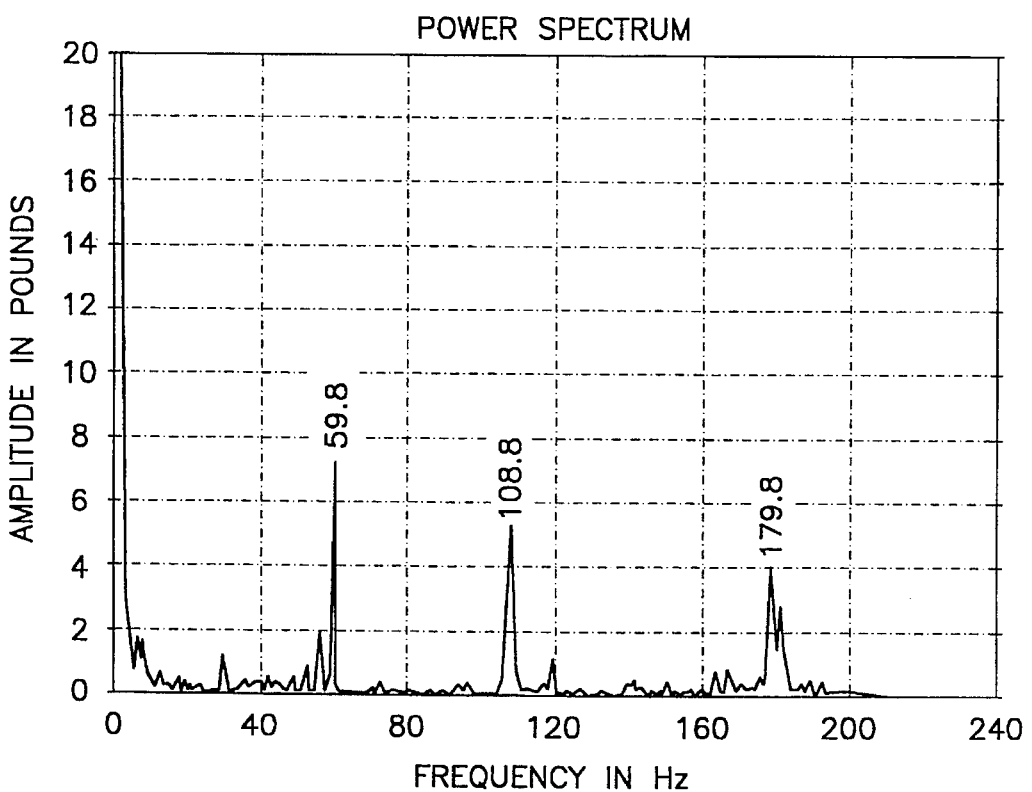
Fig. 7 RADIAL LOAD CELL SIGNALS WITH GRINDER TURNING

METHOD OF MACHINE VIBRATION ANALYSIS FOR TIRE UNIFORMITY MACHINE

FIELD OF THE INVENTION

This invention relates to the field of measuring the condition of a machine, and more particularly to a method of measuring the vibration of a tire uniformity machine with signals generated by load cells on which a load wheel is mounted.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of a sufficient amplitude will cause force variations on a surface, such as a road, against which the tires roll which produce vibrational and acoustical disturbances in the vehicle upon which the tires are mounted. Regardless of the cause of the force variations, when such variations exceed an acceptable maximum level, the ride of a vehicle utilizing such tires will be adversely affected.

The adverse effects of tire non-uniformity result from the non-uniformity causing fluctuations in several types of forces which are simultaneously exerted against a surface by a tire during its rotation under load. For example, a tire non-uniformity best described as the "out of roundness" of the tire, causes variations in the radial forces on a tire, which are forces exerted in the radial direction of the tire or in a direction perpendicular to its axis of rotation and non-tangential to the road surface. Further, lateral forces, which are forces exerted in the axial direction of the tire or in a direction parallel to its axis of rotation, are increased by excessive conicity, defined as one-half of the net average lateral force resulting from a non-conical shaped tire, and this causes a tire to constantly pull in one direction.

In a non-uniform tire, the radial and lateral forces exerted by the tire will vary or change during its rotation. The variations in radial and lateral force during rotation of a tire are usually caused by differences in the stiffness and/or geometry of the tire about its circumference or tread centerline. If these differences are slight, the radial and lateral force variations are insignificant and their effects unnoticeable when the tire is installed on a vehicle. However, when these differences exceed a certain level, the radial and/or lateral force variations may be significant enough to cause rough riding conditions and/or difficult handling situations. Further, as stated previously, an excessive conicity value will cause a rolling tire to pull to one side.

Consequently, methods have been developed in the past to correct for excessive force variations by removing rubber from the shoulders and/or the central region of the tire tread by means such as grinding. Most of these correction methods include the steps of indexing the tire tread into a series of circumferential increments and obtaining a series of force measurements representative of the force exerted by the tire as these increments contact a surface. This data is then interpreted and rubber is removed from the tire tread in a pattern generated by this interpretation. These correction methods are commonly performed with a tire uniformity machine, which includes an assembly for rotating a test tire against the surface of a freely rotating loading wheel. In this testing arrangement, the loading wheel is moved in a manner dependent on the forces exerted by the rotating tire and those forces are measured by appropriately placed measuring devices. When a tire being tested yields less than acceptable results, shoulder and center rib grinders are used to remove a small amount of the tire tread at precisely the location of non-uniformities detected by the measuring devices. As the tire is rotated, it is measured and ground simultaneously. In a sophisticated tire uniformity machine (TUM), such as a Model No. D70LTW available from the Akron Standard Co. of Akron Ohio, the force measurements are interpreted by a computer and rubber is removed from the tire tread using grinders controlled by the computer. Examples of machines utilizing these methods are disclosed in U.S. Pat. Nos. 3,739,533, 3,946,527, 4,914,869, and 5,263,284.

Any vibration that is generated by the grinder assembly of the tire uniformity machine is detected by its force variation measuring elements. Small quantities of vibration are acceptable because electronic filters are used to remove this extraneous noise. But when the motor bearings wear out or grind wheels are defective or improperly installed, excessive vibration will occur. Detection of this excessive vibration by the force measuring elements causes the tire uniformity machine to grind the tire tread at the wrong locations, resulting in excessive grind time, fewer tires processed, and more scrap tires. In addition, there is a need to detect the beat frequencies caused by two sources of vibration, such as the grinder motors, with slightly different frequencies and phase.

Currently, the prior art method of detecting excessive vibration is to use an external vibration analyzer with a movable accelerometer, which a technician manually locates on different points of the tire uniformity machine. Problems with this technique are that the equipment is costly, it takes several hours to complete the vibration analysis, and the resulting downtime of the tire uniformity machine is expensive. Also, since defects in the machine are usually discovered on an infrequent basis, problems are often not discovered before more costly damage results.

As discussed above and illustrated by the previously cited patents, efforts have been, and are continuously being made to more efficiently correct tire non-uniformity. Nothing in the prior art, however, suggests evaluating the quantity of extraneous vibration in the tire uniformity machine prior to mounting a tire.

SUMMARY OF THE INVENTION

In accordance with the invention, there is provided a method for analyzing the vibration of a tire uniformity machine having a number of rotating components. The vibration of the tire uniformity machine is monitored with load cells when the machine is idle. The load cells, which are mounted to a load wheel, generate output voltage signals that are amplified and then acquired by a computer through an analog to digital conversion as unfiltered, amplified voltage signals. These signals are transformed to a frequency domain representation, using a conventional Fast Fourier Transform. The computer then calculates a power spectrum indicating groups of frequencies and their amplitude for each rotating portion of the tire uniformity machine. Then, selected groups of frequencies and their amplitude are compared with acceptable amplitudes for the selected groups of frequencies. An alarm signal is output from the computer when at least one of the amplitudes of the different frequencies is greater than the acceptable amplitude for that frequency. In addition, the power spectrum can detect the interaction between two vibrating sources, which results in a beat frequency, typically having a low frequency value.

Prior methods and apparatus do not provide the benefits of the present invention, which achieves its intended purposes, objectives and advantages over the prior art devices through a new, useful and unobvious combination of method steps and component elements, with no increase in the number of functioning parts, at a reduction in operational cost, and by utilizing only readily available materials and conventional components.

It is an object of the present invention to provide a method for measuring the quantity of extraneous vibration in a tire uniformity machine. A further object is to obviate the problems and limitations of the prior art methods. Other objects of this invention will be apparent from the following description and claims.

BRIEF DESCRIPTION OF THE DRAWINGS

The structure, operation, and advantages of the illustrated embodiment of the invention will become further apparent upon consideration of the following description taken in conjunction with the accompanying drawings, wherein:

FIG. 4 illustrates a power spectrum generated from lateral load cell signals of a tire uniformity machine in which the grinding assemblies are not rotating;

FIG. 5 illustrates a power spectrum generated from lateral load cell signals of a tire uniformity machine in which the grinding assemblies are rotating;

FIG. 6 illustrates a power spectrum generated from radial load cell signals of a tire uniformity machine in which the grinding assemblies are not rotating; and FIG. 7 illustrates a power spectrum generated from radial load cell signals of a tire uniformity machine in which the grinding assemblies are rotating.

DETAILED DESCRIPTION OF THE INVENTION

Figure 1:
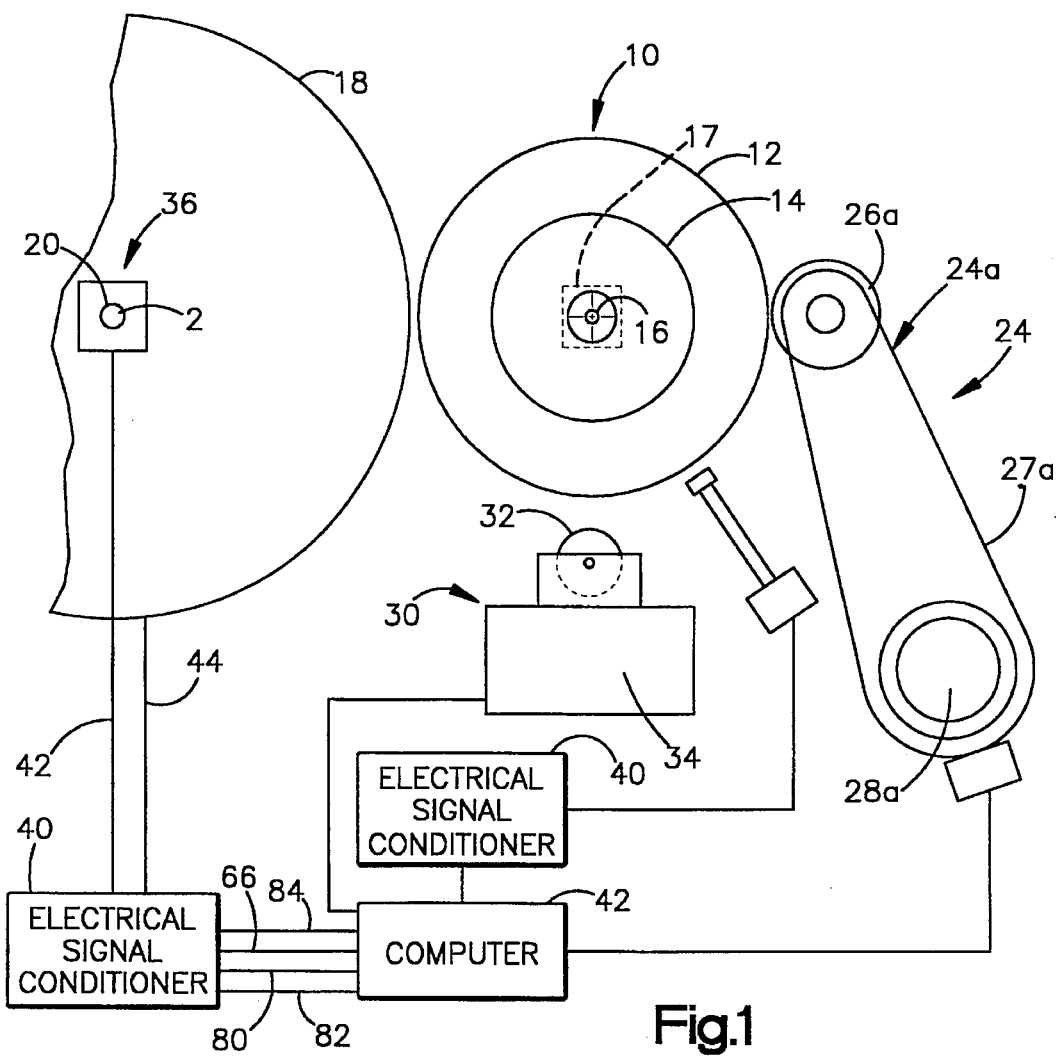
FIG. 1 is a schematic illustration of the top view of a tire uniformity machine in accordance with the invention with a tire mounted thereon.
Figure 2:
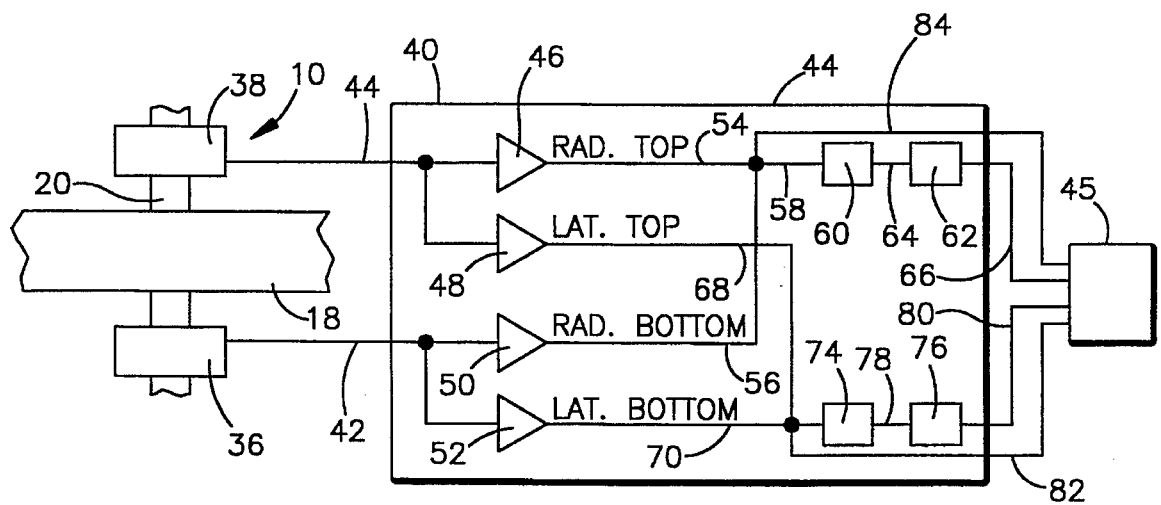
FIG. 2 is a schematic illustration of a side view of the load wheel of the tire uniformity machine of FIG. 1 showing the load wheel mounted between two load cells which generate output signals to an electrical signal conditioner connected to a computer.

Referring to FIGS. 1 and 2, there is illustrated a tire uniformity machine (TUM) 10 in accordance with the invention adapted for mounting a tire 12. Tire 12 is typically a pneumatic tire having a circumferential tire tread with top and bottom shoulder regions and a central region between the top and bottom shoulder regions. The tire 12 can be mounted on a rim 14 secured to a tire spindle 16 and inflated to a desired pressure. A variable speed motor 17, shown with phantom lines, rotates the tire spindle 16 and rim 14. The tire 12 can be placed under load by a load wheel 18, which is rotatably supported on a spindle 20 extending through the load wheel. During the testing of the tire for non-uniformities, the load wheel 18 is pressed against the tire to load the inflated tire with a specified force (for example, 600 to 1900 lb) to simulate road conditions. The load wheel 18, spindle 20, radial and lateral load cells 36, 38 assembly is mounted to bearing blocks (not shown) and are moved by conventional means, such as an electric motor (not shown) operating through a ball-and-screw connection, to move the load wheel 18 into and out of engagement with the tire 12. A shoulder grinding assembly 24 is located substantially 180° with respect to tire 12 from load wheel 18. The shoulder grinding assembly 24 includes substantially identical top and bottom shoulder grinders (only 24 is illustrated and described), which include grinding wheels that are powered by motors and are independently moved into and out of engagement with the shoulder regions of tire 12. As shown, the top shoulder grinder 24, including a grinding wheel 26a powered by a motor 28a, can be moved into and out of engagement with the shoulder portions of tire 12 by any conventional means, such as hydraulic servo devices (not shown). A center grinder assembly 30 is located adjacent wheel 12 approximately 90° counter-clockwise about tire 12 from load wheel 18. The center grinder assembly 30 has a grinding wheel 32 that is powered by a motor 34 and is moved into and out of engagement with the central region of the tread of tire 12 by conventional means, such as with an hydraulic servo device (not shown).

Conventional radial and lateral load cells 36,38 are mounted on spindle 20 with load wheel 18 suspended there between, as shown in FIG. 2. The radial and lateral load cells 36,38 are each typically used to measure the lateral and radial forces transmitted from the tire 12 as it rotates against the load wheel 18. Each of the load cells 36,38 includes a lateral load cell section conventionally used to measure the lateral force exerted by the tire 12 against load wheel 18 in a direction parallel to the axis of rotation extending about which the load wheel rotates. The load cells 36,38 also include a radial load cell section conventionally used to measure the radial force at the point of intersection of the tire 12 and the load wheel 18 exerted by the tire 12 against the load wheel 18 and through spindle 20 about which the load wheel rotates.

Voltage signals, proportionate to the amplitude of the radial and lateral forces, are generated by load cells 36,38 and inputted through lines 42 and 44, respectively, into an electric signal conditioner 40, which converts the force measurement voltage signals generated by the load cells 36,38 into signals which can be inputted to and stored in a computer 45. The electric signal conditioner 40 includes radial top and lateral top amplifiers 46 and 48, respectively, connected by line 44 to load cell 38 and radial bottom and lateral bottom amplifiers 50 and 52, respectively, connected by line 42 to load cell 36, as shown in FIG. 2.

The amplified output signals from the radial top and radial bottom amplifiers 46,50 are carried through lines 54 and 56, respectively, which connect to a single line 58. The combined amplified output signals of the radial top and radial bottom amplifiers 46,50 is input through line 58 into an anti-aliasing filter 60 to cut off the high frequency outputs, i.e. greater than approximately 45 Hertz, from load cells 36,38 so that the high frequency content contained in the amplified load cell signal does not cause aliasing in the analog to digital conversion. The electric signal conditioner 40 also includes a low pass filter 62 connected to anti-aliasing filter 60 through line 64. The low pass filter 62 attenuates frequencies greater than 16 hertz, from the combined output signal of the radial top and radial bottom amplifiers 46,50 so that the signal bandwidth is limited to frequencies generated by the tire and load wheel. The output signal from low pass filter 62 is directed through a line 66 into computer 45.

The amplified output voltage signals from the lateral top and lateral bottom amplifiers 48 and 52, respectively, are directed through lines 68 and 70 and combine in line 72 for being input into an anti-aliasing filter 74 to cut off the high frequency outputs, i.e. greater than approximately 45 Hertz, from load cells 36,38 so that the high frequency content contained in the amplified load cell signal does not cause aliasing in the analog to digital conversion. The electric signal conditioner 40 also includes a low pass filter 76 connected to anti-aliasing filter 74 through line 78. The low pass filter 76 attenuates frequencies greater than about 16 hertz, from the combined output signal of the lateral top and lateral bottom amplifiers 48 and 52 so that the signal band width is limited to frequencies generated by the tire and load wheel. The amplified output signal from low pass filter 76 is directed through a line 80 into computer 45.

Computer 45, conventionally programmed to determine the conicity, lateral force values, radial run-out, and radial force values of the tire 12, and to control the corrective grinding action to take, as discussed in U.S. patent application Ser. No. 08/534,809, entitled METHOD OF CORRECTING CONICITY, RADIAL RUN OUT, AND FORCE VARIATIONS IN A PNEUMATIC TIRE , assigned to The Goodyear Tire & Rubber Co., the assignee of the present invention, is connected to the shoulder grinding assembly 24 and to the center grinder assembly 26 to position these grinding assemblies, as required.

The present invention analyzes the vibrations of the tire uniformity machine 10 to determine the existence of defects in the rotating parts of the machine and to overcome the problem of false measurements that cause excessive grinding of the tire. In particular, the invention is directed toward using the load cells 36 and 38 to measure the vibrations of the tire uniformity machine 10 during the idle time of the machine. The idle time of the tire uniformity machine 10 is typically the time between the removal of one tire from the tire spindle 16 and the loading of another tire into the machine 10 to be mounted on rim 14 and inflated to a desired pressure. The load cells 36 and 38, which are used to measure the vibrations of the tire uniformity machine 10, output voltage signals corresponding to the vibration of the machine. The voltage signals being output from load cells 36 and 38 also correspond to the vibration of the load wheel 18. The vibration of the load wheel 18 is primarily caused by the vibrations existing in machine 10 caused by rotating components such as a load wheel spindle 20, a motor-driven tire spindle 16, the tire grinding assemblies 24, and the center grinding assembly 34. The voltage signals being output from load cells 36 and 38 are directed through lines 42 and 44, respectively, into an electrical signal conditioner 40. In particular, the voltage signals from load cell 36 are carried through line 42 into the radial bottom amplifier 50 and the lateral bottom amplifier 52 and the voltage signals from load cell 38 is directed through line 44 into the radial top amplifier 46 and the lateral top amplifier 48. The amplified voltage signals from the lateral top and lateral bottom amplifiers 48 and 52 are directed through lines 68 and 70, respectively, which are interconnected and sent through a line 82 to computer 45. The amplified voltage signals from the radial top amplifier 46 and the radial amplifier 50 are carried through lines 54 and 56 which are interconnected and directed through a line 84 to computer 45. The voltage signals from the radial and lateral load cells 36 and 38 are inputted into computer 45 as analog signals which correspond to the monitored radial and lateral forces during a predetermined period of time.

The computer 45 samples the analog signals being inputted from the radial and lateral load cells 36 and 38 for a predetermined time and converts the analog signals to digital signals. Next, computer 45 converts the digital signals to a frequency domain signal representation using a Conventional Fast Fourier Transform (FFT) program. The computer then operates on the frequency domain signal representation to calculate a power spectrum, as shown in FIGS. 4–7, of discrete frequency components in hertz versus the amplitude or magnitude of the discrete frequency components in pounds. Selected frequency components are then compared with selected groupings of frequencies representing critical frequencies generated by different rotating parts of the tire uniformity machine 10. An acceptable amplitude for the selected groups of frequencies, representing critical frequencies generated by the rotating parts operating as designed, is inputted into the computer. If the amplitude of the different groups of frequencies generated from the voltage signals outputted by the load cells 36,38 is greater than the acceptable amplitudes for selected groups of frequencies corresponding to the various rotating parts of the tire uniformity machine, an alarm signal is output by the computer. The alarm signal indicates that a rotating portion of the tire uniformity machine 10 is defective. The alarm signal could be inputted into a display monitor and/or used to activate an alarm device such as a light or audible alarm, i.e., a bell or buzzer, to alert a machine operator that the tire uniformity machine 10 is vibrating at a level beyond an acceptable limit. The rotating component of the tire uniformity machine 10, which is causing the unwanted vibration, can be isolated as described herein below.

Figure 3:
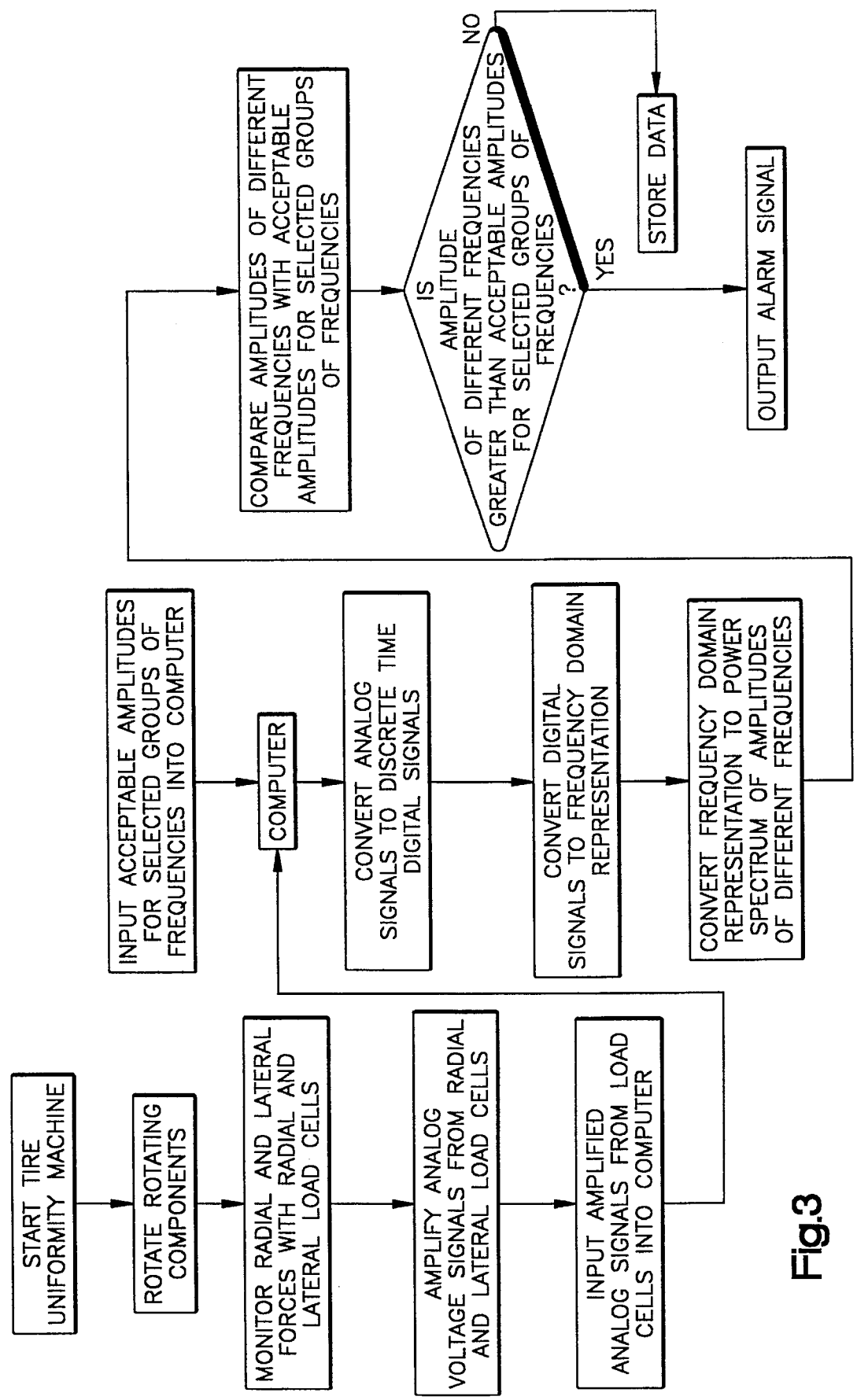
FIG. 3 is a flow diagram illustrating the operation of the referenced invention.

The routine for analyzing the vibration of the tire uniformity machine is shown in the flow diagram of FIG. 3. First the tire uniformity machine 10 is started. Then, during the period when the machine is idle, i.e., while a tire is not loaded on rim 14, one or more of the rotating components are rotated. Next, the radial and lateral forces are monitored with radial and lateral load cells 36 and 38. The analog voltage signals generated by the radial and lateral load cells are then amplified in an electrical signal conditioner 40. Next, the amplified analog signals are inputted into computer 45. Also, acceptable amplitudes for selected groups of frequencies corresponding to the critical frequency of the different rotating components are input into the computer 45. The computer 45 then performs an analog to digital conversion of the analog signals to digital signals. The digital signals are converted to frequency domain representation with a conventional FFT program. The computer then calculates a power spectrum of amplitudes of different frequencies from the frequency domain representations. Next, the amplitudes of the different frequencies are compared with acceptable amplitudes for selected groups of frequencies corresponding to the critical frequencies of different rotating components. Then, if the amplitude of the different frequencies is greater than the acceptable amplitudes for selected groups of frequencies, an alarm signal is output from the computer. Otherwise, the data from the comparison can be stored for future analysis.

An example of a typical vibrating component of the tire uniformity machine 10 is the synchronous motor 17 which turns the tire spindle 16 through a conventional coupling device (not shown). The motor 17 typically operates at 1800 revolutions per minute (rpm). To determine the critical frequency generated by the motor, the revolutions per minute are divided by 60. The resulting critical frequency is 30 revolutions per second (rps) or 30 hertz. Thus, if the amplitude of the frequency at 30 Hz, as shown on the power spectrum, is greater than the amplitude of the critical frequency generated by the motor 17 and the coupling device driving spindle 16 established by the operating specifications, there is an indication that a vibration exists in the tire uniformity machine 10 because of some defect in either the motor 17 or the coupling device connecting the motor to spindle 16. Referring to FIGS. 4 and 5, the amplitude of the 30 hertz signal, corresponding to the critical frequency of motor 17, is about 1.5 pounds. Assuming that the motor 17 has an operating amplitude of less than about 2 pounds for the critical frequency, according to the original operating specifications, the power spectrum of the radial section of load cells 36 and 38 shows that the motor is operating properly and no alarm signal is output from computer 45. The data from the power spectrum can be stored in the computer or off line for future analysis which might be desired.

Another example of the method of vibration analysis in accordance with the present invention involves the motors which drive the shoulder grinding assemblies 24 and the center grinding assembly 34. For example, grinder motor 28a drives grinding wheel 26a through a belt 27a. The grinder motor 28a is an induction motor which typically operates at 3600 rpm. Dividing this speed by 60 results in the grinding assembly operating at 60 rps or at a critical frequency of 60 Hz. Therefore, in the same manner as discussed before, if the amplitude of the 60 Hz frequency component in the power spectrum is greater than a predetermined amplitude of the critical frequency corresponding to the vibration of the grinder motor 28a operating according to its specifications, the operator would be alerted that a problem exists in the grinder motor 28a. As shown in FIG. 4, when the grinder assemblies are not operating, the radial section of load cells 36 and 38 generate output voltage signals which, when operated on by computer 45, form a group of frequency signals around 60 hertz that have an amplitude of less than 2 pounds. After the grinding assembly 24 is turned on and the grinding wheels are rotating, another group of frequency signals around 60 hertz, as shown in FIG. 5, have an amplitude of about 11.5 pounds. Assuming that the amplitude of the critical frequency around 60 hertz should be about eight pounds at the initial operating specifications, the power spectrum of FIG. 5 indicates that there is a vibration at about 60 hertz whose amplitude is about 3.5 pounds above the amplitude of the acceptable critical frequency. Note that when, as shown in FIG. 6, the grinder assemblies are not operating, the lateral sections of load cells 36 and 38 output voltage signals which, when operated on by computer 45, form a group of frequency signals around 60 hertz which have an amplitude of less than 2 pounds. Then, after the grinding assembly 24 is turned on and the grinding wheels are rotating, a group of frequency signals around 60 hertz, as shown in FIG. 7, have an amplitude of about 7 pounds. This illustrates that when one section of the load cells 36 and 38, i.e. the lateral load cell section, picks up excessive vibration, the other section of the load cell, i.e. the radial load cell in this case, might not pick up the excessive vibration.

The excessive vibration is probably caused by one of the grinder assemblies 24 or 34. To determine which specific grinder assembly is vibrating excessively and is therefore defective, only one grinder device 24a, 24b or 34 is turned on at one time. Then, the power spectrum is generated as discussed above and if the amplitude of the group of frequencies near the frequency of 60 hertz is above the amplitude designated in the operating specifications, it can be deduced whether the specific grinder device is defective.

In another example, excessive vibration results from either a defect in the belt drive 27a or in the grinding wheel 26a. The grinding wheel 26a typically turns at a rate of about 6800 rpm which corresponds to a critical frequency of about 109 Hz. If the amplitude of the frequency in the power spectrum at 109 Hz is above a predetermined amplitude, corresponding to the specifications for a properly balanced grinding wheel on good bearings, there is an indication that either the grinding wheel is unbalanced, the bearings of the grinding wheel are defective, or there is some foreign material stuck to the grind stone.

As shown in FIG. 4, when the grinder assemblies are not operating, the lateral section of the load cells 36 and 38 generate output voltage signals which, when operated on by computer 45, form a power spectrum with a group of frequency signals around 109 hertz that have an amplitude of less than 2 pounds. Then, after the grinding assembly 24 is turned on and the grinding wheels are rotating, a group of frequency signals around 109 hertz, as shown in FIG. 5, have an amplitude of about 11.5 pounds. Assuming that the amplitude of the critical frequency of 109 hertz should be about 4 to 5 pounds at the initial operating specifications, the power spectrum of FIG. 5 indicates that there is a vibration at about 109 hertz whose amplitude is about 6 to 7 pounds above the acceptable magnitude for this frequency. This vibration is probably caused by one of the grinding wheels 26a, 26b (not shown), or 32. To determine the specific grinding wheel of grinder assemblies 24 or grinding assembly 34 that is vibrating excessively and is therefore defective, only one grinder device 24a, 24b or 34 is turned on at one time. Then, the power spectrum is generated as discussed above, and if the amplitude of the group of frequencies near 109 hertz is above the amplitude designated in the operating specifications, it can be deduced which grinding wheel is defective.

As previously discussed, the load cell readings for analyzing the vibration of the tire uniformity machine 10 are typically taken during the idle time of machine 10, i.e., between the time when one tire has been unloaded from tire spindle 16 and another tire is being moved onto the spindle for testing. During that idle time period, the load wheel 18 is still rotating from its last contact with the rotating tire 12. The load wheel 18 is normally rotated at less than 60 rpm and therefore generates a frequency of less than 1 Hz and, preferably, between about 0.4 Hz to about 0.8 Hz. As with the examples above, if the amplitude of the frequency generated by the load wheel, as indicated in the power spectrum, is above a predetermined amplitude, there is probably a defect in the load wheel 18 or the bearings on which it is mounted. It is also within the terms of the invention to rotate the load wheel with a small motor to get higher frequency and also check for imbalance.

While the invention is described in connection with a tire uniformity machine, it is within the scope of the invention to measure the vibration of other machines incorporating load cells.

It is apparent that there has been provided in accordance with this invention apparatus and methods for analyzing the condition of a machine with a plurality of rotating components that satisfy the objects, means and advantages set forth hereinbefore. According to the invention, a method for analyzing the vibration of a machine with a plurality of rotating components including a freely rotating load wheel mounted to a load wheel spindle, a motor driven spindle, and a plurality of motor driven rotating grinders is used to determine which of the rotating components of the machine is vibrating at an amplitude above its operating specifications and is therefore either mounted improperly or otherwise defective. The load cell readings can also be used for detecting the existence of beat frequency, such as that caused by two grinder motors which have slightly different frequency and phase from each other. The result is a low frequency, typically 2 Hz or less, the sample rate to detect this frequency is about 10 to 20 times per second. If the amplitude of the low frequency is above a predetermined amplitude when the motors are operating within their specifications, a beat frequency exists. Under these conditions, the computer can output an alarm signal.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

What is claimed:

1. A method of analyzing the condition of a machine with a plurality of rotating components including a freely rotating load wheel mounted to a load wheel spindle, a motor driven spindle, and a plurality of motor driven rotating grinders, said method including the steps of:

rotating one or more of said rotating components;

monitoring radial and lateral forces generated by the vibration of said one or more rotating components with load cells mounted to said load wheel spindle;

inputting analog voltage signals from said load cells into a computer, said analog voltage signals corresponding to said monitored radial and lateral forces during a predetermined period of time;

converting said analog signals to digital signals;

converting said digital signals to a frequency domain representation;

converting said frequency domain representation to a power spectrum representing the amplitudes of different frequencies; and comparing said amplitudes of different frequencies with acceptable amplitudes for selected groups of frequencies.

2. The method of claim 1 including the step of outputting an alarm signal from said computer when at least one of said amplitudes of different frequencies is greater than at least one of said acceptable amplitudes for selected groups of frequencies.

3. The method of claim 1 including the steps of:

rotating all of said of rotating components; and outputting an alarm signal from said computer when at least one of said amplitudes for at least one of said different frequencies is greater than at least one of said acceptable amplitudes for selected groups of frequencies corresponding to an acceptable level of vibration of one or more of said plurality of rotating components.

4. The method of claim 1 including the steps of:

rotating said motor driven drive spindle; and outputting an alarm signal from said computer when at least one of said amplitudes for at least one of said different frequencies is greater than at least one of said acceptable amplitudes for selected groups of frequencies corresponding to an acceptable level of vibration of said motor driven drive spindle.

5. The method of claim 1 including the steps of:

rotating said one or more of said plurality of rotating grinders with a plurality of individual motors each coupled to one of said plurality of rotating grinders with an individual belt drive; and outputting an alarm signal from said computer when at least one of said amplitudes for at least one of said different frequencies is greater than at least one of said acceptable amplitudes for selected groups of frequencies corresponding to the frequency generated by said individual motors each coupled to one of said plurality of rotating grinders.

6. The method of claim 1 including the step of monitoring radial and lateral forces generated by the vibration of said one or more rotating components with a first radial and lateral load cell mounted to a first end of said load wheel spindle and a second radial and lateral load cell mounted to an opposite second end of said load wheel spindle.

7. The method of claim 1 including the steps of:

rotating said load wheel; and outputting an alarm signal from said computer when at least one of said amplitudes for at least one of said different frequencies is greater than at least one of said acceptable amplitudes for selected groups of frequencies corresponding to the frequency of said load wheel.

8. The method of claim 1 including the step of inputting said analog signals from said first and second radial and lateral load cells as amplified, unfiltered analog signals into said computer through an analog to digital conversion.

9. The method of claim 8 including the step of converting said digital signals to a frequency domain representation by mathematically operating on said digital signals with a Fast Fourier Transform.

10. The method of claim 1 including the steps of:

rotating two or more of said rotating components; and detecting a beat frequency generated by the interaction of said two or more of said rotating components.

11. A method of analyzing the condition of a machine with a plurality of rotating components, said method including the steps of:

rotating one or more of said rotating components;

monitoring radial and lateral forces generated by the vibration of said one or more rotating components with load cells mounted to one of said rotating components;

inputting analog signals from said load cells into a computer, said analog signals corresponding to said monitored radial and lateral forces during a predetermined period of time;

converting said analog signals to digital signals, through an analog to digital conversion;

converting said digital signals to a frequency domain representation;

converting said frequency domain representation to a power spectrum representing the amplitudes of different frequencies; and comparing said amplitudes of different frequencies with acceptable amplitudes for selected groups of frequencies.

12. The method of claim 11 including the step of outputting an alarm signal from said computer when at least one of said amplitudes for different frequencies is greater than at least one of said acceptable amplitudes for selected groups of frequencies.

13. The method of claim 12 including the step of inputting said analog signals from said load cells as amplified, unfiltered analog signals into said computer through an analog to digital conversion.

14. The method of claim 13 including the step of converting said digital signals to a frequency domain representation by mathematically operating on said digital signals with a Fast Fourier Transform.

15. The method of claim 11 including the step of measuring said condition corresponding to said vibration of said machine.

16. The method of claim 11 including the steps of:

rotating two or more of said rotating components; and detecting a beat frequency generated by the interaction of said two or more of said rotating components.

* * * * *